Figure 4:
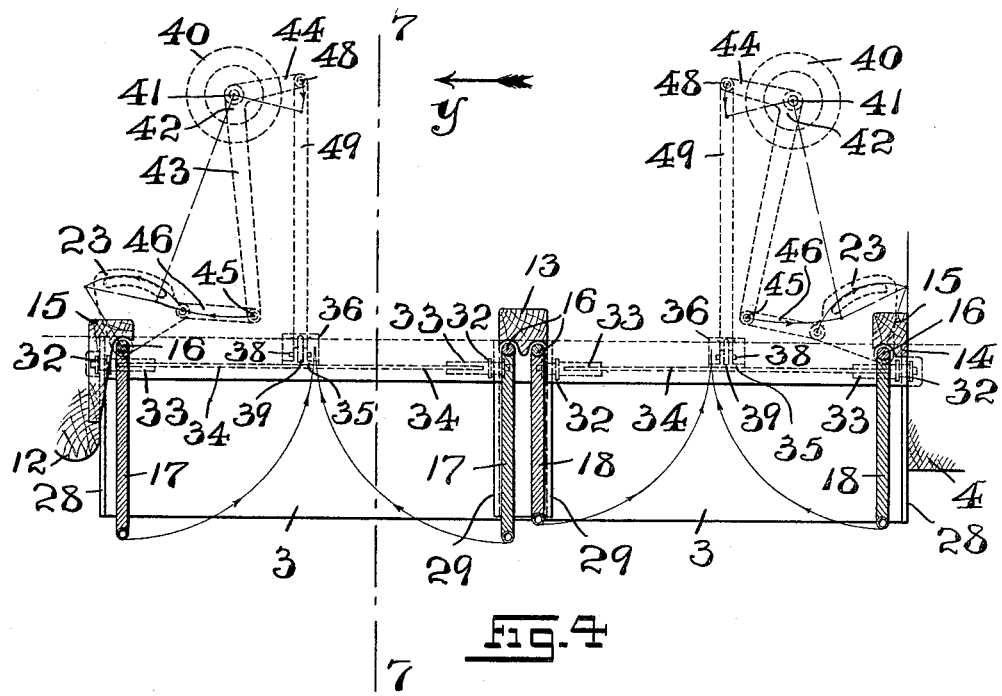

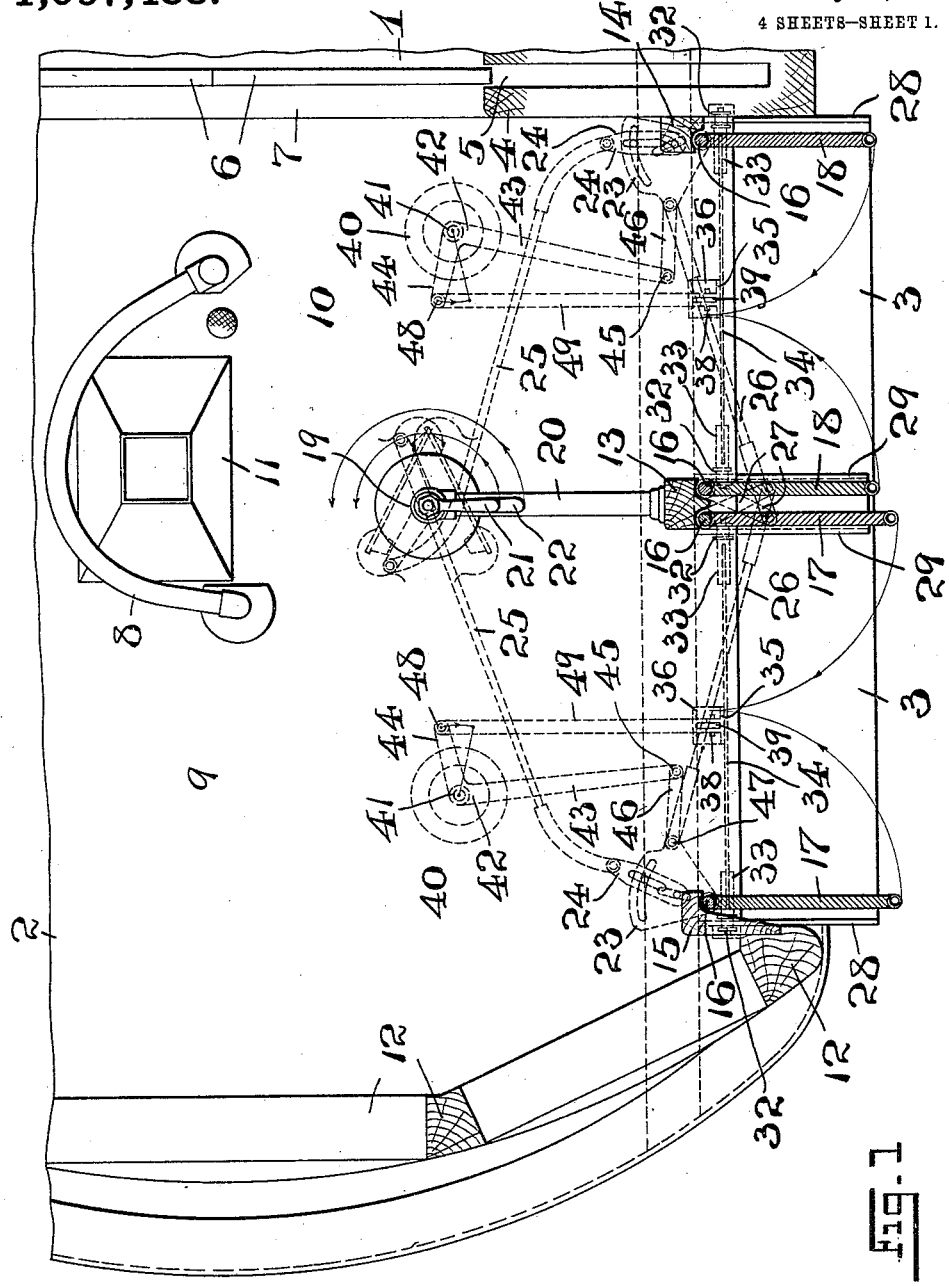

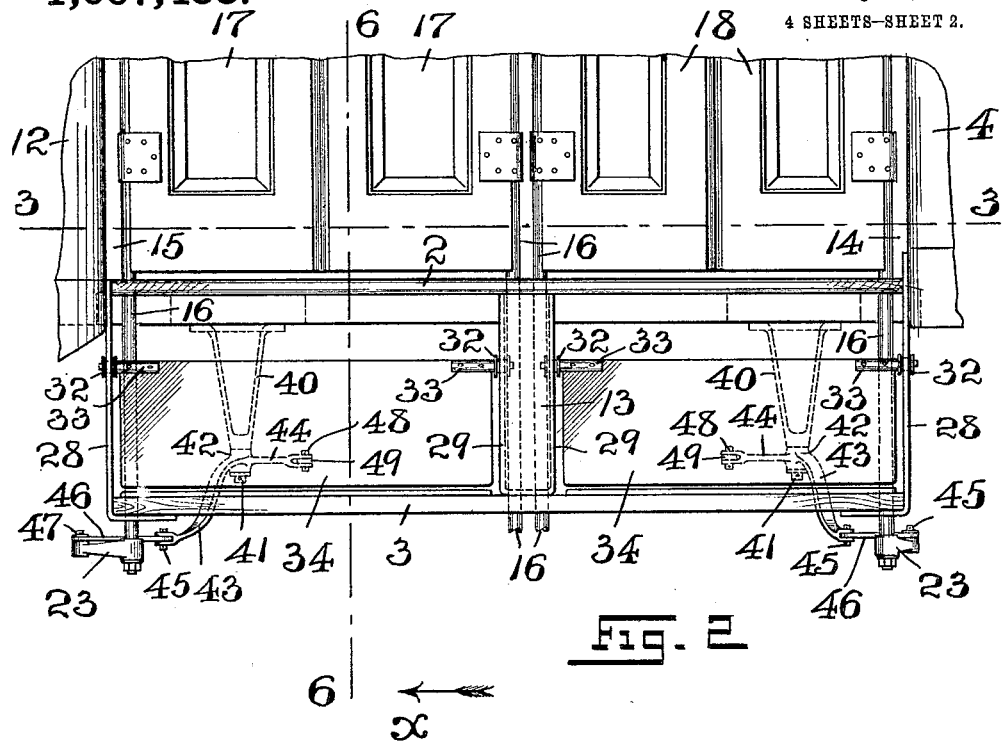
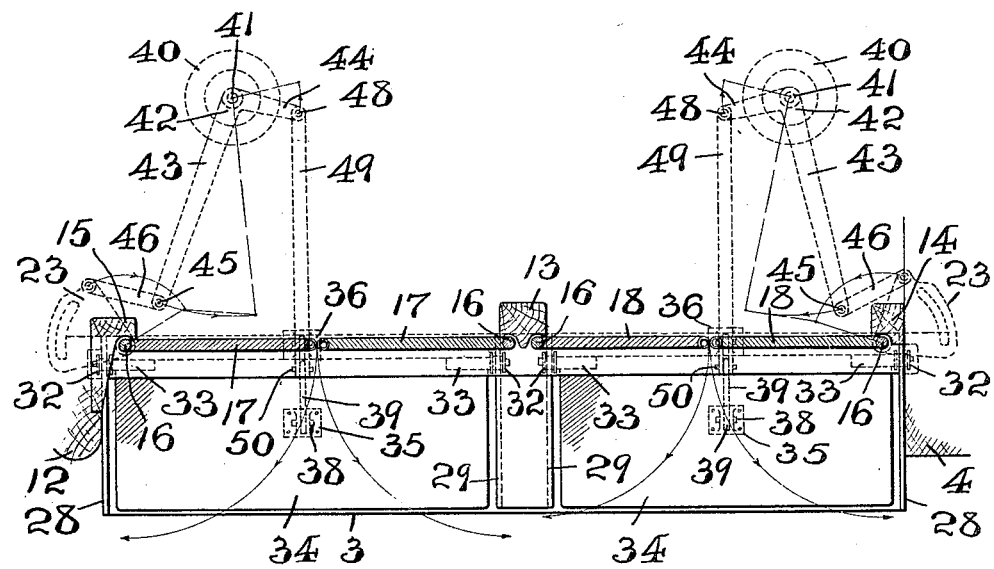

C. A. REMELIUS.
PASSENGER CAR.
APPLICATION FILED JAN. 20, 1910.

1,067,488.

Patented July 15, 1913.
4 SHEETS—SHEET 3.

WITNESSES:
Fredk. H. W. Fraentzel
Anna H. Alter

INVENTOR:
Charles A. Remelius,
BY
Fraentzel and Richards
ATTORNEYS

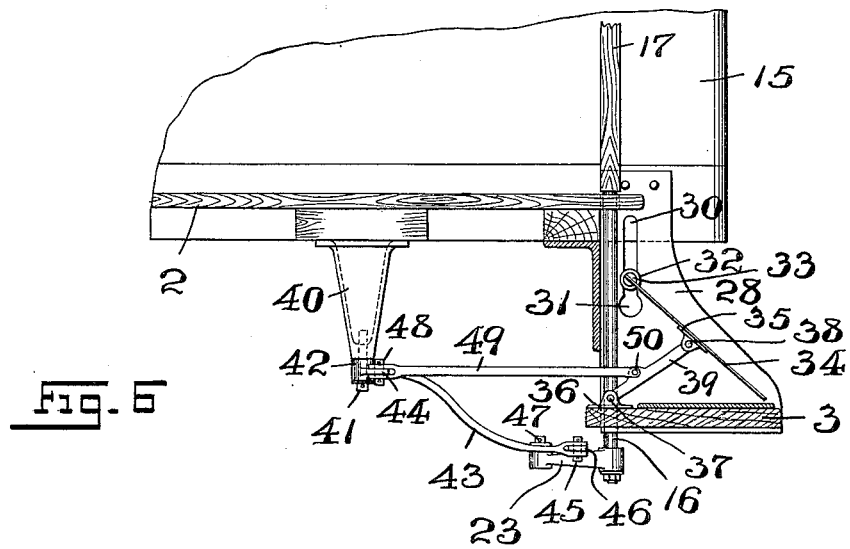
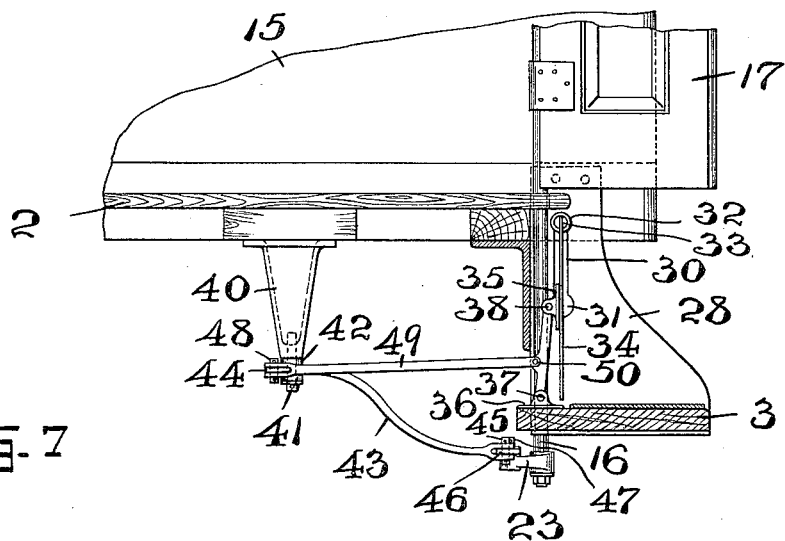

UNITED STATES PATENT OFFICE.

CHARLES A. REMELIUS, OF NEW YORK, N. Y., ASSIGNOR TO PREPAYMENT CAR SALES COMPANY, A CORPORATION OF WEST VIRGINIA.

PASSENGER-CAR.

1,067,488.        Specification of Letters Patent.        Patented July 15, 1913.

Application filed January 20, 1910. Serial No. 539,050.

*To all whom it may concern:*

Be it known that I, CHARLES A. REMELIUS, a citizen of the United States, residing at New York, in the county of New York and State of New York, have invented certain new and useful Improvements in Passenger-Cars; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in passenger-cars of the street-railway type; and this invention has reference, more particularly, to a novel combined door and step-operating mechanism for railway cars, and especially for street-railway cars, the platform of the car being provided at the side-step thereof with one or more doors which are opened and closed by means of mechanism under the control of the conductor stationed upon the car; and the step of the platform being provided with a device or means which incloses or covers the step during the time that the door or doors are closed, but which step-inclosing or cover-device or devices are operated simultaneously with the movements of the door or doors by the mechanism under the control of the conductor.

The invention has for its principal object to provide a novel, simple and easily operated step-inclosing or cover-device or devices and mechanism for operating the same; and, the invention has for its further object to provide in connection with a platform of a railway car, which has independent and separate entrance and exit passageways, a door or gate, or doors or gates, for each passageway, a step-covering device or devices, and mechanism for opening and closing said doors, and simultaneously operating the said step-covering device or devices, said mechanism being operated by and being under the control of the conductor, when the car has come to a standstill, so that a person can not jump on or off the car while it is in motion.

The invention has for its further object to provide a novel and simply constructed, as well as an efficiently operating mechanism which is operated by and is under the perfect control of the conductor, for operating two sets of doors and two sets of step-covering devices, one for the entrance-part and the other for the exit-part of the platform, either singly or collectively, so as to provide a clear passageway to the entrance of the platform, while the exit remains closed, or vice versa; or, to provide at one and the same time, two clear passage-ways to and from the platform of the car.

Other objects of this invention not at this time more particularly enumerated will be clearly understood from the following detailed description of my present invention.

With the various objects of the present invention in view, the said invention consists in the various novel arrangements and combinations of the devices and parts, both as to location and the relative arrangements of the parts, as well as in the details of the construction of the same, all of which will be more fully described in the following specification, and then finally embodied in the clauses of the claims which are appended to and which form an essential part of this specification.

The invention is clearly illustrated in the accompanying drawings, in which:—

Figure 5:
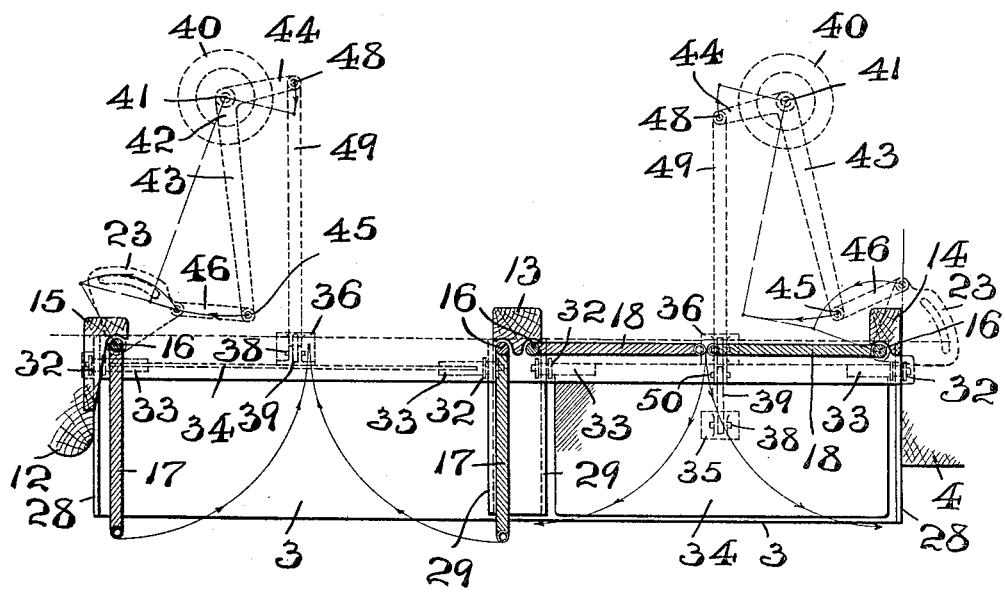

Figure 1 is a horizontal section of one end-portion of a car-body and part of the platform-vestibule, the platform being represented in plan, said view showing in horizontal section and in their opened relation with said platform, several hinged or pivoted swing-doors, said view also showing in plan the combined door and step-cover actuating and operating mechanism, the step-covering devices being indicated in dotted outline in their raised positions. Fig. 2 is a detail side view of the step portion of the platform of the car, with the step-covering devices shown in their position when inclosing or covering the step, and the doors being shown closed, said view however showing only the lower portions of the doors, certain parts of the operating mechanism being omitted from said view. Fig. 3 is a horizontal section taken on line 3—3 in said Fig. 2. Fig. 4 is a view, similar to that represented in said Fig 3, of the same parts, but showing the doors open, and the step-inclosing or covering devices in their raised positions. Fig. 5 is a similar view of the parts represented in said Figs. 3 and 4, showing one set of doors opened and another set of doors closed, and illustrating further, one of the step-inclosing or covering devices in its raised position, and the other step-inclosing or covering device being shown in its lowered position. Fig. 6 is a transverse vertical section taken on line 6—6 in Fig. 2, looking in the direction of the arrow $x$; and Fig. 7 is a similar sectional representation taken on line 7—7 in Fig. 4 looking in the direction of the arrow $y$.

Similar characters of reference are employed in all of the above described views, to indicate corresponding parts.

Referring now to the several figures of the drawings, the reference-character 1 indicates a portion of the body of any usual type of street-railway car which is provided at one or both ends with the usual inclosed or vestibule-platform 2, and the usual side-step 3 leading therefrom.

The reference-character 4 indicates the usual frame-work between the car-body 1 and the platform 2, formed with the usual guides or ways 5 in which are movably arranged the usual doors 6 for opening and closing the entrance 7 from the platform into the body of the car. The platform may be provided with any suitably formed dividing rail, as 8, which divides the platform into an entrance part 9 and an exit-part 10, and 11 indicates a fare-receiving box of any usual construction, such as is ordinarily placed upon the platforms of cars of the "pay as you enter" type.

The position of the conductor upon the platform of the car is at one side of the fare-receiver and in close proximity to the levers for operating the door-opening and closing mechanism and the mechanism for operating the step-covering or inclosing devices, so that he can readily take hold of and operate the said levers of the mechanism to be presently more fully described.

The large opening at the side of the platform 2, and which is formed by the said platform and the frame-work 12 constituting the vestibule of the platform, is divided by a vertical post or standard 13, which is placed midway, or approximately so, in the side-opening of the platform. Other standards or posts 14 and 15 are raised upon the platform and are respectively connected with the frame-work 4 of the car body 1 and the vestibule-frame 12, substantially as in the manner shown in several figures of the drawings. Suitably arranged in close juxtaposition to the said standards or posts 13, 14 and 15, are a series of vertically disposed rods or posts 16, the said rods or posts having their lower end-portions rotatably mounted in suitable bearings connected with the side step 3, and having their upper end-portions suitably secured to the roof member of the car, substantially in the manner of the construction set forth in my previous application for Letters-Patent filed Dec. 9, 1909, Serial No. 532,247. Suitably connected with the said rods or posts 16 are suitable door-sections or gates 17 and 18, the door-sections 17 being arranged so as to close the entrance portion to the platform, and the said door sections 18 being correspondingly arranged to close the exit portions of the platform, substantially in the manner shown in several figures of the drawings.

Located at or near the station of the conductor upon the platform 2 is a tubular post 19, with which is connected a laterally extending bar or rod 20, the latter being suitably connected on its outer end with the previously mentioned central post or standard 13, so as to clearly separate the entrance-part of the platform from the exit-part thereof at the point as will be clearly evident. The said tubular post or standard 19 has suitably mounted therein mechanism similar to that set forth in my said previous-mentioned application, Serial No. 532,247, said mechanism being manually operated by means of a pair of independent hand-levers or crank-arms 21 and 22 in the manner set forth in the application Serial No. 532,247, hereinabove mentioned. The respective door or gate-sections are independently or collectively operated from these hand-levers or crank-arms 21 and 22, by means of the sector-plates 23, the crank-arms 24, the links 25, the links 26 and the connecting crank-arms 27 in precisely the same manner as described in the specification of my said former application, Serial No. 532,247, and substantially in the manner illustrated in the drawings which accompany said application. This door or gate-opening and closing mechanism having been fully described in the said specification of my former application, Serial No. 532,247, it will not be necessary, in this application to describe the detail construction of the parts of the said mechanism.

From an inspection of the several figures of the drawings, it will be seen that the step 3 is provided with a pair of end-plates 28, and with a pair of centrally disposed and correspondingly formed dividing plates 29. Each end-plate or member 28, as well as each dividing member or plate 29, is formed with a vertical slot or elongated opening 30, the said opening being provided at its lower end, preferably, with an enlarged open portion, as 31. Slidably disposed in each elongated opening 30 is a spool-like rolling member or element 32, and suitably connected with each spool-like member 32 is a shank-like portion 33. Suitably connected with each pair of such shank-like portions or members 33 are step-inclosing plates or covers 34, said plates or covers being preferably made of sheet metal, and two of such plates being used with the step 3, so as to be adapted to cover or inclose the entrance as well as the exit portion of the said step. Each cover or plate 34 is provided upon its back or under surface with a bearing-plate 35, and the step 3 is provided at or near its rear edge with correspondingly disposed bearing-plates 36. Suitably arranged between each pair of bearing plates 35 and 36, and pivotally connected with the said bearing-plates by means of pivot-pins or bolts 37 and 38 are suitably formed links 39. Depending from the lower frame-work of the platform 2 are a pair of hangers or bracket-like members 40 in the lower end of each of which is suitably secured a pivot-pin 41. Operatively connected with the said pivot-pin 41 are bell-cranks 42, each bell-crank comprising a pair of arms 43 and 44. Pivotally connected with the free end-portion of the arm 43, by means of a suitable pin 45, is a connecting link 46, said connecting link 46 being pivotally connected by means of a pin 47 with a sector-plate 23. In like manner, the arms 44 of the bell-cranks 42 are pivotally connected by means of pivot-pins 48 with links or connecting rods 49, each rod 49 being pivotally connected at its opposite end, by means of a pivot-pin 50 with a link 39 of a step-inclosing plate or cover 34, as will be clearly evident from an inspection of several figures of the drawings.

Referring more particularly to Figs. 6 and 7 of the drawings, the manner of actuating the said step-inclosing covers or plates 34 for readily moving them from their closed positions indicated in Figs. 2, 3 and 6 to their opened positions shown in Figs. 1, 4 and 7, is by means of the said bell-cranks 42 and the connecting links 39 and 49, when said bell-cranks are actuated by the movements of the sector-plate 28 and links 46, said sector-plates, as has been stated, being actuated from the crank-arms or hand-levers 21 and 22.

The relative movements of the several devices or parts for opening and closing the doors or gates, as well as removing the step inclosing plates from their inclosing and angular relation with the step shown in Fig. 6 to the raised position shown in Fig. 7, and returning the said plates 34 to their said angular positions, are indicated by the arrow-headed arcs shown more particularly in Figs. 1, 3, 4 and 5 of the drawings, from which the movements of the said parts will be clearly evident.

The method of operating the respective doors or gates in pairs, either singly or collectively, so as to open either the entrance portions or exit portions of the car platform or both simultaneously as may be desired is the same as that set forth in my previous application for Letters-Patent Serial No. 532,247; and, simultaneously with the swinging movements of each pair of doors or gates whether singly or collectively, either one or both of the said step-inclosing or covering plates is moved in the manner hereinbefore stated, by the manipulation of either or both of the said hand-levers or cranks 21 and 22.

While I have shown the step-inclosing or covering devices in connection with the hinged platform doors or gates, and the mechanism for opening and closing the latter, it will be clearly evident that the said step-inclosing plates may be used with the platform of the car independent of such doors or gates and the mechanism for operating the same.

I am aware that changes may be made in the general arrangements and combinations of the several devices and parts, as well as in the details of the construction of the said parts, without departing from the scope of the present invention as set forth in the foregoing specification, and as defined in the claims which are appended to the said specification. Hence, I do not limit myself to the exact arrangements and combinations of the said devices and parts as described in the said specification, nor do I confine myself to the exact details of the construction of the said parts as illustrated in the accompanying drawings.

I claim:

1. A car provided with a platform, said platform having an entrance and exit-portion, and a step, doors located in close proximity to said step, a step-covering device connected with and angularly disposed above the tread of said step, and means connected with said step-covering device and doors for simultaneously operating said step-covering device and said doors.

2. A car provided with a platform, said platform having an entrance and exit-portion, and a step, doors located in close proximity to said step, a step-covering device connected with and angularly disposed above the tread of said step, and means connected with said step-covering device and doors, and operated from a station upon said platform and under the control of the conductor, for operating said step-covering device and said doors.

3. A car provided with a platform, said platform having an entrance and an exit-portion, and a step, a dividing rail upon said platform, a plurality of doors for opening and closing said entrance and exit-portions, a plurality of step-covering devices movably and angularly disposed above the tread of the step, and mechanisms arranged beneath the platform and connected with said doors and said step-covering devices, said mechanisms having a portion extending above the platform, so as to be under the control of the conductor for operating said step-covering devices and said doors.

4. A car provided with a platform, said platform having an entrance and an exit-portion, and a step, a dividing rail upon said platform, a plurality of doors for opening and closing said entrance and exit-portions, a plurality of step-covering devices movably and angularly disposed above the tread of the step, and mechanisms under the control of the conductor and connected with said doors and said step-covering devices for operating each set of doors and step-covering devices.

5. A car provided with a platform, said platform having an entrance and exit-portion, and a step, doors located in close proximity to said step, an angularly disposed step-covering plate movably connected with said step, a bearing-plate secured to said step-covering plate, a bearing-plate secured upon said step, a link pivotally disposed between and connected with said bearing-plates, a bell-crank pivoted beneath said platform, a connecting rod between said bell-crank and said link, and means connected with said bell-crank and with said doors for simultaneously operating said doors and said step-covering plate.

6. A car provided with a platform, said platform having an entrance and exit-portion, and a step, doors located in close proximity to said step, an angularly disposed step-covering plate movably connected with said step, a bearing-plate secured to said step-covering plate, a bearing-plate secured upon said step, a link pivotally disposed between and connected with said bearing-plates, a bell-crank pivoted beneath said platform, a connecting rod between said bell-crank and said link, an oscillatory sector-plate, a link connected with said sector-plate and said bell-crank, and means connected with said sector-plate for simultaneously operating said doors and said step-covering plate.

7. A car provided with a platform, said platform having an entrance and exit-portion, and a step, a plurality of doors for opening and closing said entrance and exit-portions, a plurality of step-covering devices movably and angularly disposed above the tread of the step, bearing-plates secured to said step-covering plates, and bearing-plates secured upon said step, links pivotally disposed between and connected with the bearing-plates of said step-covering plates and the bearing-plates of said step, bell-cranks pivoted beneath said platform, connecting rods between said bell-cranks and said links and mechanisms connected with said bell-cranks for actuating said bell-cranks and simultaneously therewith operating the said doors.

8. A car provided with a platform, said platform having an entrance and exit-portion, and a step, a plurality of doors for opening and closing said entrance and exit-portions, a plurality of step-covering devices movably and angularly disposed above the tread of the step, bearing-plates secured to said step-covering plates, and bearing-plates secured upon said step, links pivotally disposed between and connected with the bearing-plates of said step-covering plates and the bearing-plates of said step, bell-cranks pivoted beneath said platform, connecting rods between said bell-cranks and said links, oscillatory sector-plates, links between said sector-plates and said bell-cranks, and mechanisms connected with said sector-plates for actuating said sector-plates and simultaneously therewith operating the said doors.

9. A car provided with a platform, said platform having an entrance and exit-portion, and a step, doors located in close proximity to said step, said step being provided with members formed with elongated openings, rollers movably arranged in said openings, and a shank-like element extending from each roller, a step-covering plate connected with the shank-like elements, a bearing-plate secured to said step-covering plate, and a bearing-plate secured upon said step, a link pivotally disposed between and connected with said bearing-plates, a bell-crank pivoted beneath said platform, a connecting rod between said bell-crank and said link, and means connected with said bell-crank and with said doors for simultaneously operating said doors and said step-covering plate.

10. A car provided with a platform, said platform having an entrance and exit-portions, and a step, doors located in close proximity to said step, said step being provided with members formed with elongated openings, rollers movably arranged in said openings, and a shank-like element extending from each roller, a step-covering plate connected with the shank-like elements, a bearing-plate secured to said step-covering plate, and a bearing-plate secured upon said step, a link pivotally disposed between and connected with said bearing-plates, a bell-crank pivoted beneath said platform, a connecting rod between said bell-crank and said link, an oscillatory sector-plate, a link connected with said sector-plate and said bell-crank, and means connected with said sector-plate for simultaneously operating said doors and said step-covering plate.

11. A car provided with a platform, said platform having an entrance and exit-portion, and a step, a plurality of doors located in close proximity to said step, said step being provided with members formed with elongated openings, rollers movably arranged in said openings, and a shank-like element extending from each roller, a plurality of step-covering plates connected with said shank-like elements, said step-covering plates being movably and angularly disposed above the tread of the step, bearing-plates secured to said step-covering plates, and bearing-plates secured upon said step, links pivotally disposed between and connected with the bearing-plates of said step-covering plates and the bearing-plates of said step, bell-cranks pivoted beneath said platform, connecting rods, and mechanisms connected with said bell-cranks for actuating said bell-cranks and simultaneously therewith operating the said step-covering plates and said doors, in pairs.

12. A car provided with a platform, said platform having an entrance and exit-portion, and a step, a plurality of doors located in close proximity to said step, said step being provided with members formed with elongated openings, rollers movably arranged in said openings, and a shank-like element extending from each roller, a plurality of step-covering plates connected with said shank-like elements, said step-covering plates being movably and angularly disposed above the tread of the step, bearing-plates secured to said step-covering plates, and bearing-plates secured upon said step, links pivotally disposed between and connected with the bearing-plates of said step-covering plates and the bearing-plates of said step, bell-cranks pivoted beneath said platform, connecting rods between said bell-cranks and said links, oscillatory sector-plates, links between said sector-plates and said bell-cranks, and mechanisms connected with said sector-plates for actuating said sector-plates and simultaneously therewith operating the said step-covering plates and said doors, in pairs.

13. A car provided with a platform, said platform having a step, a plurality of doors located in close proximity to said step, said step being formed with end-members and dividing members, said end-members and said dividing members being provided with elongated openings, rollers movably arranged in said openings, shank-like elements extending from said rollers, angularly disposed step-covering plates arranged between and connected with each pair of shank-like elements, bearing-plates secured to said step-covering plates, and bearing-plates secured to said step, links pivotally disposed and connected with the bearing-plates of said step-covering plates and the bearing-plates of said step, bell-cranks pivoted beneath said platform, connecting rods between said bell-cranks and said links, and mechanisms connected with said bell-cranks for actuating said bell-cranks and simultaneously therewith operating the said step-covering plates and said doors, in pairs.

14. A car provided with a platform, said platform having a step, a plurality of doors located in close proximity to said step, said step being formed with end-members and dividing members, said end-members and said dividing members being provided with elongated openings, rollers movably arranged in said openings, shank-like elements extending from said rollers, angularly disposed step-covering plates arranged between and connected with each pair of shank-like elements, bearing-plates secured to said step-covering plates, and bearing-plates secured to said step, links pivotally disposed and connected with the bearing-plates of said step-covering plates and the bearing-plates of said step, bell-cranks pivoted beneath said platform, connecting rods between said bell-cranks and said links, oscillatory sector-plates, crank-arms between said sector-plates and said bell-cranks, and mechanisms connected with said sector-plates for actuating said sector-plates and simultaneously therewith operating the said step-covering plates and said doors, in pairs.

In testimony that I claim the invention set forth above I have hereunto set my hand this 18th day of January, 1910.

CHARLES A. REMELIUS.

Witnesses:
FREDK. C. FRAENTZEL,
FREDK. H. W. FRAENTZEL.

---

Copies of this patent may be obtained for five cents each, by addressing the "Commissioner of Patents, Washington, D. C."